(12) United States Patent
Takaoka

(10) Patent No.: US 10,400,819 B2
(45) Date of Patent: Sep. 3, 2019

(54) SQUEEZE FILM DAMPER BEARING DEVICE

(71) Applicant: HONDA MOTOR CO., LTD., Tokyo (JP)

(72) Inventor: Keisuke Takaoka, Wako (JP)

(73) Assignee: HONDA MOTOR CO., LTD., Toyko (JP)

( * ) Notice: Subject to any disclaimer, the term of this patent is extended or adjusted under 35 U.S.C. 154(b) by 0 days.

(21) Appl. No.: 15/898,921

(22) Filed: Feb. 19, 2018

(65) Prior Publication Data

US 2018/0245629 A1 Aug. 30, 2018

(30) Foreign Application Priority Data

Feb. 24, 2017 (JP) .................................. 2017-033473

(51) Int. Cl.

| F16C 27/04 | (2006.01) |
|---|---|
| F16C 19/06 | (2006.01) |
| F16C 19/26 | (2006.01) |
| F01D 25/16 | (2006.01) |
| F16C 27/06 | (2006.01) |

(Continued)

(52) U.S. Cl.
CPC .......... *F16C 27/045* (2013.01); *F16C 27/066* (2013.01); *F16C 33/581* (2013.01); *F16C 33/6685* (2013.01); *F16C 35/063* (2013.01); *F16C 35/067* (2013.01); *F01D 25/164* (2013.01); *F16C 19/06* (2013.01);
(Continued)

(58) Field of Classification Search
CPC ........ F16C 19/06; F16C 19/26; F16C 27/045; F16C 27/066; F16C 33/76; F16C 33/78; F16C 2360/23; F16C 25/164; F16C 25/183; F16C 2240/50; F16C 2240/54; F16C 25/083; F16C 33/581; F16C 35/063; F16C 35/067; F16C 33/6685; F16C 2226/60; F16C 2226/62; F01D 25/162; F01D 2220/32

USPC .......... 384/99, 119–120, 215, 581, 500, 535, 384/540, 550; 415/119; 277/554, 569, 277/578–581, 916

See application file for complete search history.

(56) References Cited

U.S. PATENT DOCUMENTS

| 4,337,983 A | * | 7/1982 | Hibner | .................. | F01D 25/164 384/99 |
|---|---|---|---|---|---|
| 4,527,912 A | * | 7/1985 | Klusman | ............... | F01D 25/164 384/99 |

(Continued)

FOREIGN PATENT DOCUMENTS

| CA | 2937018 A1 | * | 3/2017 | ........... | F01D 25/164 |
|---|---|---|---|---|---|
| DE | 102007023242 A1 | * | 11/2008 | .......... | F16F 15/0237 |

(Continued)

*Primary Examiner* — Marcus Charles
(74) *Attorney, Agent, or Firm* — Rankin, Hill & Clark LLP

(57) ABSTRACT

A squeeze film damper bearing device includes an inner race that is fitted around an outer periphery of a rotating shaft, an outer race that is supported on an inner periphery of a bearing retaining member, a plurality of rolling bodies that are disposed between the inner race and the outer race, and an annular space that is defined between the bearing retaining member and the outer race by a pair of seal rings and forms a squeeze film. The annular space includes a first space facing an outer peripheral face of the outer race and a second space facing an end face in an axial direction of the outer race.

3 Claims, 4 Drawing Sheets

(51) Int. Cl.
*F16C 33/66* (2006.01)
*F16C 35/063* (2006.01)
*F16C 35/067* (2006.01)
*F16C 33/58* (2006.01)

(52) U.S. Cl.
CPC .......... *F16C 19/26* (2013.01); *F16C 2226/60* (2013.01); *F16C 2226/62* (2013.01); *F16C 2360/23* (2013.01)

(56) References Cited

U.S. PATENT DOCUMENTS

| | | | | | |
|---|---|---|---|---|---|
| 4,693,616 | A | * | 9/1987 | Rohra | F01D 25/164 384/99 |
| 5,071,262 | A | * | 12/1991 | Monzel | F01D 25/164 384/581 |
| 5,149,206 | A | * | 9/1992 | Bobo | F01D 25/164 248/562 |
| 5,178,400 | A | * | 1/1993 | Singh | F01D 25/164 277/644 |
| 5,201,585 | A | * | 4/1993 | Gans | F01D 25/164 384/215 |
| 5,228,784 | A | * | 7/1993 | Bobo | F16C 27/045 384/487 |
| 5,988,888 | A | * | 11/1999 | Une | F16C 27/02 384/119 |
| 6,695,478 | B2 | * | 2/2004 | Bos | F01D 25/164 384/99 |
| 6,872,003 | B2 | * | 3/2005 | Dusserre-Telmon | F01D 25/164 384/99 |
| 9,500,100 | B2 | * | 11/2016 | Carter | F01D 25/164 |
| 9,752,616 | B2 | * | 9/2017 | Saadi | F01D 25/16 |
| 2006/0083449 | A1 | * | 4/2006 | Laurant | F16C 27/045 384/99 |
| 2011/0188995 | A1 | * | 8/2011 | Thomassin | F02C 7/06 415/119 |
| 2016/0160924 | A1 | * | 6/2016 | Meyers | F01D 25/164 384/474 |
| 2017/0335767 | A1 | * | 11/2017 | Gysling | F02C 7/06 |

FOREIGN PATENT DOCUMENTS

| | | | | |
|---|---|---|---|---|
| EP | 1431600 | A1 * | 6/2004 | ............ F01D 25/16 |
| EP | 2662537 | A3 * | 10/2017 | ........... F01D 25/164 |
| FR | 2965858 | A1 * | 4/2012 | ............ F16C 33/586 |
| JP | S59-212514 | | 12/1984 | |
| JP | H08-93775 | | 4/1996 | |

\* cited by examiner

SQUEEZE FILM DAMPER BEARING DEVICE

CROSS REFERENCE TO RELATED APPLICATIONS

The present application claims priority under 35 U.S.C. § 119 to Japanese Patent Application No. 2017-33473 filed Feb. 24, 2017 the entire contents of which are hereby incorporated by reference.

BACKGROUND OF THE INVENTION

Field of the Invention

The present invention relates to a squeeze film damper bearing device having an inner race that is fitted around an outer periphery of a rotating shaft, an outer race that is supported on an inner periphery of a bearing retaining member, a plurality of rolling bodies that are disposed between the inner race and the outer race, and an annular space that is defined between the bearing retaining member and the outer race by means of a pair of seal rings and forms a squeeze film.

Description of the Related Art

Japanese Patent Application Laid-open No. 8-93775 has made known a radial type squeeze film damper bearing device in which an outer race of a ball bearing having an inner race fitted around the outer periphery of a rotating shaft is supported on a bearing retaining member via a squeeze film, and vibration in the radial direction of the rotating shaft is damped by the squeeze film.

Furthermore, Japanese Patent Application Laid-open No. 59-212514 has made known a thrust type squeeze film damper bearing device in which a pair of thrust plates are disposed on opposite sides in the axial direction of a thrust collar projectingly provided on the outer periphery of a rotating shaft, the pair of thrust plates are each supported on a support platform via a squeeze film, and vibration in the axial direction of the rotating shaft is damped by the squeeze film.

Since the conventional squeeze film damper bearing device has only either a damping function for the radial direction of the rotating shaft or a damping function for the axial direction thereof, in order to obtain a damping function for both directions it is necessary to provide both a radial type squeeze film damper bearing device and a thrust type squeeze film damper bearing device, thus giving rise to the problem of an increase in dimensions and in weight.

SUMMARY OF THE INVENTION

The present invention has been accomplished in light of the above circumstances, and it is an object thereof to provide a squeeze film damper bearing device that exhibits a damping function for both the radial direction and the axial direction with a simple structure.

In order to achieve the object, according to a first aspect of the present invention, there is provided a squeeze film damper bearing device having an inner race that is fitted around an outer periphery of a rotating shaft, an outer race that is supported on an inner periphery of a bearing retaining member, a plurality of rolling bodies that are disposed between the inner race and the outer race, and an annular space that is defined between the bearing retaining member and the outer race by a pair of seal rings and forms a squeeze film, wherein the annular space comprises a first space facing an outer peripheral face of the outer race and a second space facing an end face in an axial direction of the outer race.

In accordance with the first aspect, since the squeeze film damper bearing device includes the inner race fitted around the outer periphery of the rotating shaft, the outer race supported on the inner periphery of the bearing retaining member, the plurality of rolling bodies disposed between the inner race and the outer race, and the annular space defined between the bearing retaining member and the outer race by the pair of seal rings and forming the squeeze film, when the outer race is displaced with respect to the inner periphery of the bearing retaining member in response to vibration of the rotating shaft, the squeeze film, which is formed in the annular space sandwiched between the inner periphery of the bearing retaining member and the outer periphery of the outer race, resists movement of the outer race, thereby enabling the vibration of the rotating shaft to be damped.

Since the annular space includes the first space facing an outer peripheral face of the outer race and the second space facing the end face in the axial direction of the outer race, it is possible to damp vibration in the radial direction of the rotating shaft by the squeeze film in the first space and damp vibration in the axial direction of the rotating shaft by the squeeze film in the second space, thus enabling vibration both in the radial direction and in the axial direction of the rotating shaft to be damped with a structure that has small dimensions and is lightweight.

According to a second aspect of the present invention, a pair of the second spaces are defined so as to face opposite end faces in the axial direction of the outer race.

In accordance with the second aspect, since the pair of second spaces are defined so as to face the opposite end faces in the axial direction of the outer race, it is possible for the squeeze film to exhibit more effectively a damping effect in the axial direction.

According to a third aspect of the present invention, in addition to the first or second aspect, there is provided the squeeze film damper bearing device, further including an intermediate seal ring that provides a partition between the first space and the second space.

In accordance with the third aspect, since the intermediate seal ring providing a partition between the first space and the second space is provided, it is possible, by supplying oil to the first space and the second space from different systems, to individually adjust the damping performance in the radial direction and the damping performance in the axial direction.

Note that a low pressure system shaft 15 and a sleeve 41 of embodiments correspond to the rotating shaft of the present invention, and balls 47 of the embodiments correspond to the rolling bodies of the present invention.

BRIEF DESCRIPTION OF THE DRAWINGS

These and further features of the invention will be apparent from the following description and drawings.

DESCRIPTION OF THE PREFERRED EMBODIMENTS

First Embodiment

A first embodiment of the present invention is explained below based on FIGS. 1 and 2.

Figure 1:
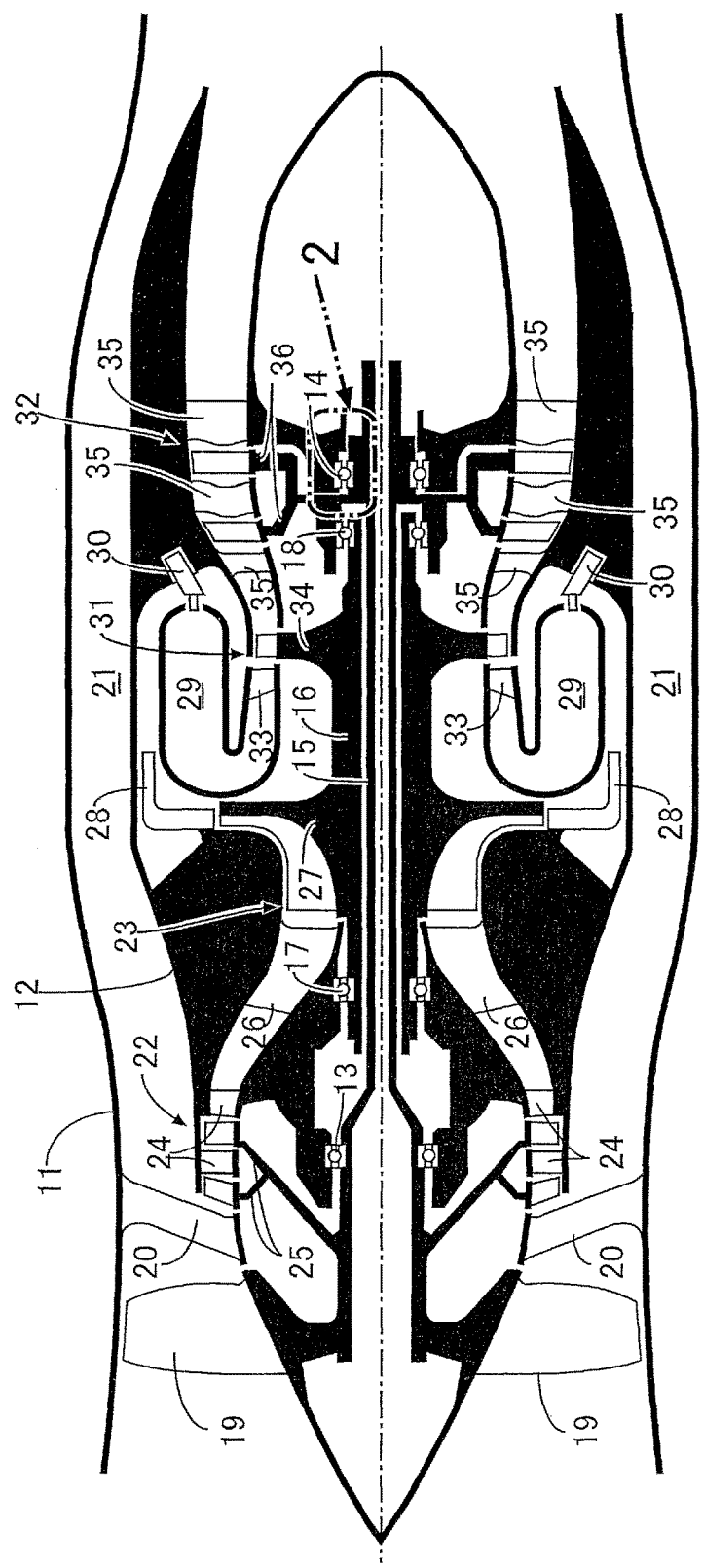
FIG. 1 is a diagram showing the overall structure of a gas turbine engine. (first embodiment).
Figure 2:
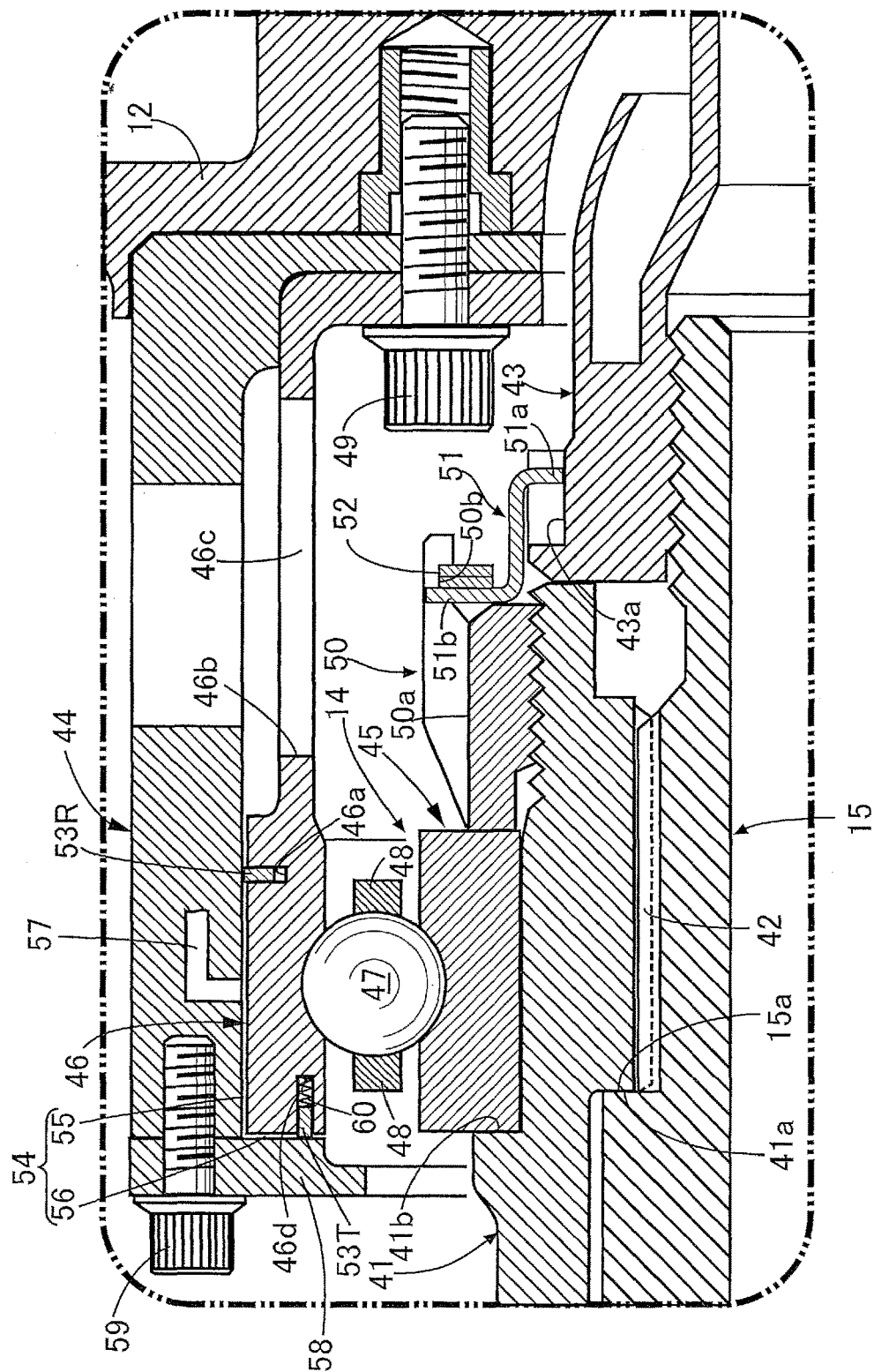
FIG. 2 is an enlarged view of part 2 in FIG. 1. (first embodiment)

As shown in FIG. 1, a gas turbine engine for an aircraft to which the present invention is applied includes an outer casing 11 and an inner casing 12, and a front part and a rear part of a low pressure system shaft 15 are rotatably supported in the interior of the inner casing 12 via a front first bearing 13 and a rear first bearing 14, respectively. A tubular high pressure system shaft 16 is relatively rotatably fitted around the outer periphery of an intermediate part in the axial direction of the low pressure system shaft 15, a front part of the high pressure system shaft 16 is rotatably supported on the inner casing 12 via a front second bearing 17, and a rear part of the high pressure system shaft 16 is relatively rotatably supported on the low pressure system shaft 15 via a rear second bearing 18.

A front fan 19 is fixed to the front end of the low pressure system shaft 15, blade ends of the front fan 19 facing an inner face of the outer casing 11. Part of the air drawn or sucked in by the front fan 19 passes through stator vanes 20 disposed between the outer casing 11 and the inner casing 12, part thereof then passes through an annular bypass duct 21 formed between the outer casing 11 and the inner casing 12 and is jetted rearward, and another part thereof is supplied to an axial type low pressure compressor 22 and a centrifugal type high pressure compressor 23 disposed in the interior of the inner casing 12.

The low pressure compressor 22 includes stator vanes 24 fixed to the interior of the inner casing 12 and a low pressure compressor wheel 25 equipped with compressor blades on the outer periphery and fixed to the low pressure system shaft 15. The high pressure compressor 23 includes stator vanes 26 fixed to the interior of the inner casing 12 and a high pressure compressor wheel 27 equipped with compressor blades on the outer periphery and fixed to the high pressure system shaft 16.

A reverse flow combustion chamber 29 is disposed to the rear of a diffuser 28 connected to the outer periphery of the high pressure compressor wheel 27, and fuel is injected into the interior of the reverse flow combustion chamber 29 from a fuel injection nozzle 30. Fuel and air are mixed in the interior of the reverse flow combustion chamber 29 and undergo combustion, and the combustion gas thus generated is supplied to a high pressure turbine 31 and a low pressure turbine 32.

The high pressure turbine 31 includes nozzle guide vanes 33 fixed to the interior of the inner casing 12 and a high pressure turbine wheel 34 equipped with turbine blades on the outer periphery and fixed to the high pressure system shaft 16. The low pressure turbine 32 includes nozzle guide vanes 35 fixed to the interior of the inner casing 12 and a low pressure turbine wheel 36 equipped with turbine blades on the outer periphery and fixed to the low pressure system shaft 15.

Therefore, when the high pressure system shaft 16 is driven with a starter motor (not shown), air that has been drawn or sucked in by the high pressure compressor wheel 27 is supplied to the reverse flow combustion chamber 29, mixed with fuel and undergoes combustion, and the combustion gas thus generated drives the high pressure turbine wheel 34 and the low pressure turbine wheel 36. As a result, the low pressure system shaft 15 and the high pressure system shaft 16 rotate, and the front fan 19, the low pressure compressor wheel 25, and the high pressure compressor wheel 27 compress air and supply it to the reverse flow combustion chamber 29, thus enabling the gas turbine engine to continue to run even when the starter motor is stopped.

While the gas turbine engine is running, part of the air drawn or sucked in by the front fan 19 passes through the bypass duct 21 and is jetted rearward thus generating the main thrust, particularly when flying at low speed. The remaining part of the air drawn or sucked in by the front fan 19 is supplied to the reverse flow combustion chamber 29, mixed with fuel, and undergoes combustion, and it drives the low pressure system shaft 15 and the high pressure system shaft 16 and is then jetted rearward, thus generating thrust.

The structure around the rear first bearing 14 is now explained with reference to FIG. 2.

A sleeve 41 for supporting the low pressure turbine wheel 36 is fitted around the outer periphery of the low pressure system shaft 15 by a spline fitting 42. The sleeve 41 is fastened to the low pressure system shaft 15 by screwing a first nut member 43 around the outer periphery of a shaft end of the low pressure system shaft 15 so as to push the sleeve 41 leftward in FIG. 2, thereby pressing a step portion 41a formed on the inner periphery of the sleeve 41 against a step portion 15a formed on the outer periphery of the low pressure system shaft 15.

The rear first bearing 14 includes an inner race 45 fitted around the outer periphery of the sleeve 41, an outer race 46 fitted into the inner periphery of a bearing retaining member 44 provided on the inner casing 12, a plurality of balls 47 disposed between the inner race 45 and the outer race 46, and a retainer 48 retaining the balls 47 at equal intervals in the peripheral direction. The bearing retaining member 44 and the outer race 46 are fastened to the inner casing 12 by bolts 49, and the inner race 45 is fastened by being urged leftward in FIG. 2 by a second nut member 50 screwed around the outer periphery of an end part of the sleeve 41, thereby being pressed against a step portion 41b formed on the outer periphery of the sleeve 41.

The outer race 46 includes a plurality of slit-shaped cutouts 46b extending in the axial direction and a plurality of rod-shaped spring portions 46c sandwiched between the plurality of cutouts 46b and extending in the axial direction, and a main body part of the outer race 46 retaining the balls 47 is therefore floatingly supported so as to be capable of moving in the radial direction and the axial direction relative to the inner casing 12.

The direction in which the first nut member 43 is screwed and the direction in which the second nut member 50 is screwed are set so as to be opposite to each other. That is, when the first nut member 43 is a right-hand screw, the second nut member 50 is a left-hand screw, and when the first nut member 43 is a left-hand screw, the second nut member 50 is a right-hand screw. A plurality of first groove portions 43a opening rightward in the axial direction in FIG. 2 are formed in the outer periphery of an end part of the first nut member 43 at equal intervals in the peripheral direction, and a plurality of second groove portions 50a opening rightward in the axial direction in FIG. 2 are formed in the outer periphery of the second nut member 50 at equal intervals in the peripheral direction.

An annular linking member 51 disposed between the first nut member 43 and the second nut member 50 includes two first projecting portions 51a that are disposed at intervals of 180° in the circumferential direction and can engage with the first groove portions 43a of the first nut member 43, and three second projecting portions 51b that are disposed at intervals of 120° in the circumferential direction and can engage with the second groove portions 50a of the second nut member 50.

A ring spring 52 that makes the linking member 51 latch with the second nut member 50 is one that is formed by winding a flat elastic metal plate with substantially two rotations into a ring shape, and an outer peripheral part thereof can engage with step portions 50b formed on the inner periphery of an end part of the second nut member 50.

Since the directions in which the first nut member 43 and the second nut member 50 are screwed are opposite to each other, if the first nut member 43 attempts to rotate in a direction in which it is loosened, the rotation acts on the second nut member 50 via the linking member 51 so as to tighten it, and it is thus possible to prevent both the first nut member 43 and the second nut member 50 from becoming loosened. Conversely, if the second nut member 50 attempts to rotate in a direction in which it is loosened, since the rotation acts on the first nut member 43 via the linking member 51 so as to tighten it, it is possible to simultaneously prevent both the first nut member 43 and the second nut member 50 from becoming loosened.

The rear first bearing 14 supporting the rear part of the low pressure system shaft 15 forms a squeeze film damper bearing. A seal ring 53R is fitted into a seal ring groove 46a formed in the outer periphery of the outer race 46, and a seal ring 53T is fitted into a seal ring groove 46d formed in one end face in the axial direction of the outer race 46.

The seal ring 53R expands radially outward due to self resilience and resiliently abuts against the inner periphery of the bearing retaining member 44, and an annular first space 55 having a predetermined gap in the radial direction is defined between the outer periphery of the outer race 46 and the inner periphery of the bearing retaining member 44. Furthermore, an end plate 58 is fixed to one end face in the axial direction of the bearing retaining member 44 by means of bolts 59, and the seal ring 53T is urged in a direction in which it abuts against an inner face in the axial direction of the end plate 58 by means of a plurality of springs 60 disposed in a bottom part of the seal ring groove 46d. As a result, an annular second space 56 having a predetermined gap in the axial direction is defined between said one end face in the axial direction of the outer race 46 and the inner face in the axial direction of the end plate 58. The first space 55 and the second space 56 communicate with each other, thus forming the annular space 54 of the present invention.

Therefore, the outer race 46 can undergo relative movement within the range of the above gap in the radial direction relative to the bearing retaining member 44, and in this process the seal ring 53R undergoes elastic deformation within the seal ring groove 46a, thus maintaining a state of abutment against the inner periphery of the bearing retaining member 44. Furthermore, the outer race 46 can undergo relative movement within the range of the above gap in the axial direction relative to the bearing retaining member 44, and in this process the springs 60 undergo elastic deformation within the seal ring groove 46d, thus maintaining a state of abutment of the seal ring 53T against the inner face in the axial direction of the end plate 58. Oil sucked up by an oil pump (not shown) is supplied to the annular space 54 via an oil passage 57 formed in the interior of the bearing retaining member 44.

The operation of the first embodiment of the present invention having the above arrangement is now explained.

When oil is supplied from the oil pump to the annular space 54 via the oil passage 57 of the bearing retaining member 44, a squeeze film is formed from a thin film of oil in the first space 55 and the second space 56 of the annular space 54. When the low pressure system shaft 15 vibrates in the radial direction and in the axial direction while the gas turbine engine is running, the vibration is transmitted to the outer race 46 of the rear first bearing 14 having the inner race 45 supported on the sleeve 41 integrally fixed to the low pressure system shaft 15.

In this process, since vibration in the radial direction and the axial direction of the outer race 46 of the rear first bearing 14 is allowed due to the spring portions 46c undergoing elastic deformation, the size of the gap in the radial direction of the first space 55 increases and decreases according to the vibration in the radial direction of the outer race 46, the outer race 46 is damped by means of a resistance force generated by flow and compression of viscous oil of the squeeze film within the first space 55, and this enables the vibration in the radial direction of the low pressure system shaft 15 to be suppressed. Furthermore, the size of the gap in the axial direction of the second space 56 increases and decreases according to the vibration in the axial direction of the outer race 46, the outer race 46 is damped by means of a resistance force generated by flow and compression of viscous oil of the squeeze film within the second space 56, and this enables the vibration in the axial direction of the low pressure system shaft 15 to be suppressed.

When the squeeze film exhibits a damping effect, oil that has absorbed vibrational energy generates heat and its temperature increases, but oil whose temperature has increased is discharged successively via abutment clearances of the seal rings 53R and 53T and fresh oil is supplied from the oil pump, thus maintaining the damping function of the squeeze film.

As described above, in accordance with this embodiment, since the annular space 54 forming the squeeze film is formed from the first space 55 facing the outer peripheral face of the outer race 46 and the second space 56 facing the end face in the axial direction of the outer race 46, it is possible to damp vibration in the radial direction of the low pressure system shaft 15 by the squeeze film of the first space 55 and to damp vibration in the axial direction of the low pressure system shaft 15 by the squeeze film of the second space 56, thereby enabling vibration both in the radial direction and in the axial direction of the low pressure system shaft 15 to be damped with a structure that has small dimensions and is lightweight.

Furthermore, since the thrust load from the front fan 19, the low pressure compressor 22, and the low pressure turbine 32 acts on the low pressure system shaft 15, if the thrust load were supported directly by the inner casing 12, a large frictional force would occur, and when the low pressure system shaft 15 vibrated movement of the outer race 46 in the radial direction would be inhibited, thus leading to the possibility that the squeeze film of the first space 55 would not be able to exhibit an effective damping function.

However, in accordance with this embodiment, since the thrust load of the low pressure system shaft 15 is supported by the squeeze film of the second space 56 facing the outer race 46, the frictional force in the radial direction acting on the outer race 46 is reduced, and the squeeze film of the first space 55 can exhibit an effective damping function.

Second Embodiment

Figure 3:
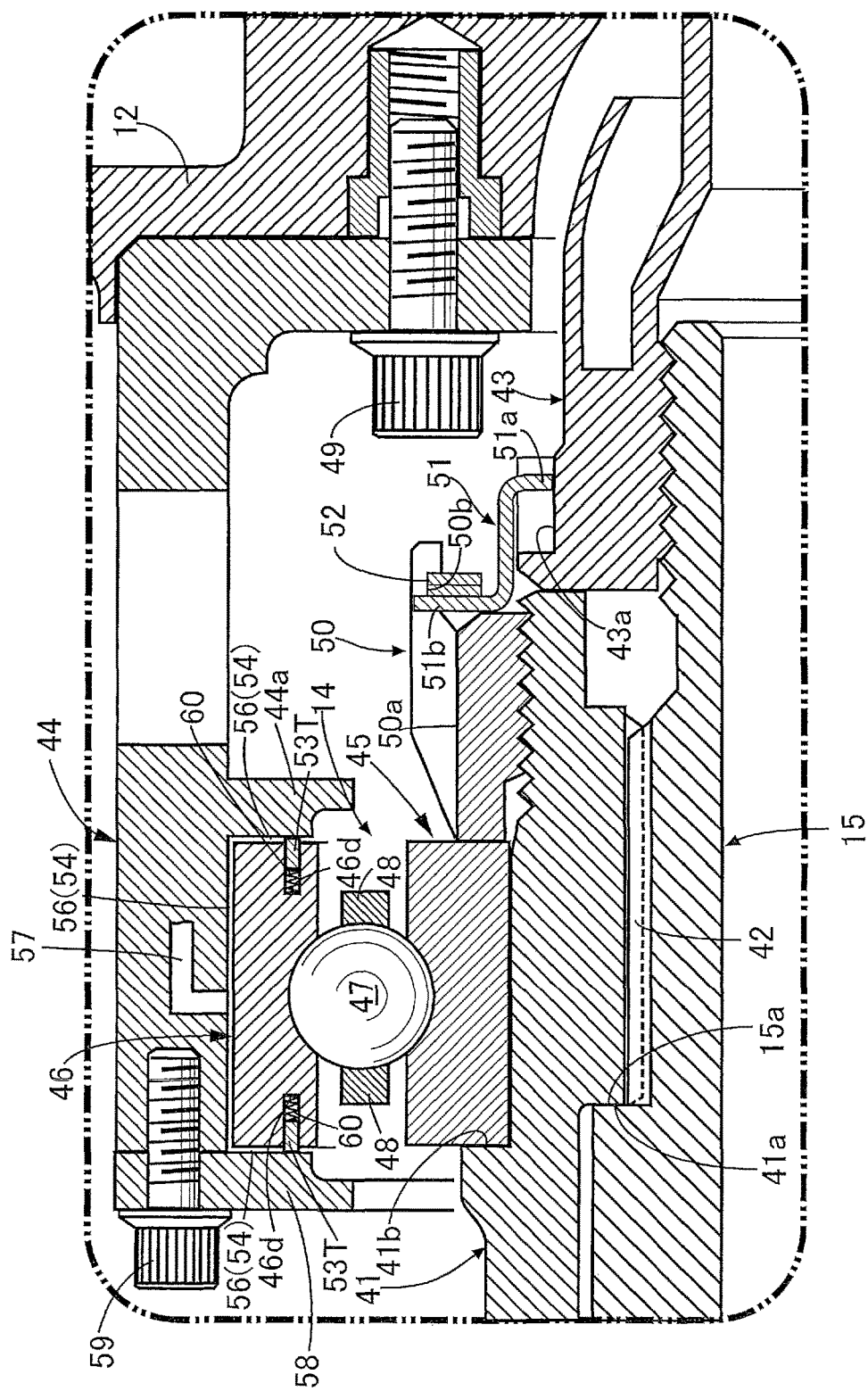
FIG. 3 is a view corresponding to FIG. 2. (second embodiment)

A second embodiment of the present invention is now explained with reference to FIG. 3.

In the second embodiment, the outer race 46 is detached from the bearing retaining member 44 and the inner casing 12 and is completely floatingly supported, and a flange 44a projecting radially inward from the inner periphery of the bearing retaining member 44 opposes the other end face in the axial direction of the outer race 46. That is, a pair of annular second spaces 56 sealed by seal rings 53T are defined on opposite end faces in the axial direction of the outer race 46, and the seal ring 53R on the outer periphery of the outer race 46 of the first embodiment is eliminated.

In accordance with this embodiment, in addition to the effects of the first embodiment, due to the squeeze films being formed on opposite sides in the axial direction of the outer race 46, the effect in damping vibration in the axial direction of the low pressure system shaft 15 can be further enhanced.

Third Embodiment

Figure 4:
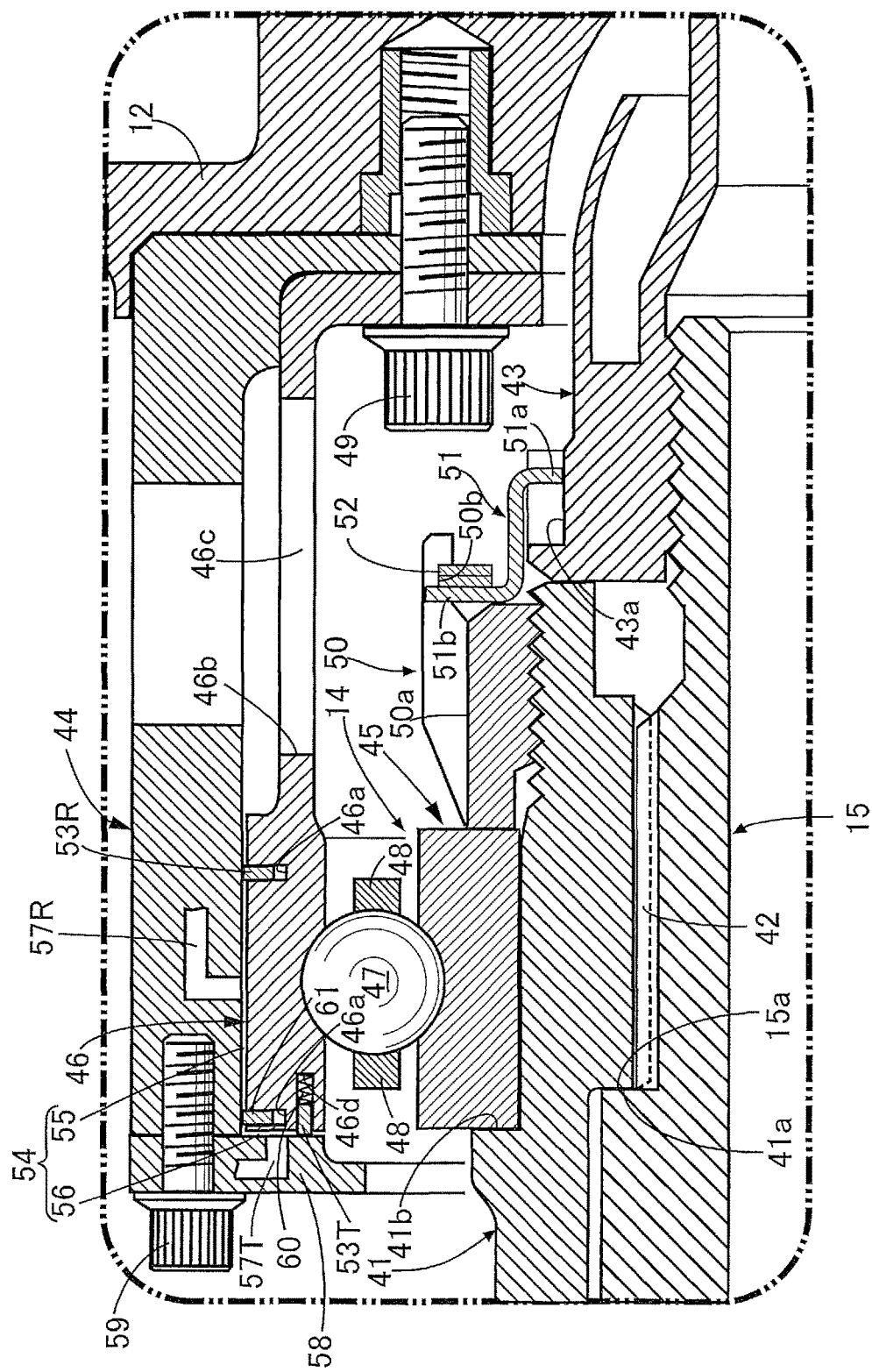
FIG. 4 is a view corresponding to FIG. 2. (third embodiment)

A third embodiment of the present invention is now explained by reference to FIG. 4.

The third embodiment is a modification of the first embodiment, and an intermediate seal ring 61 is provided on the outer periphery of the outer race 46 close to the border between the first space 55 and the second space 56. Therefore, the first space 55 is defined by the seal ring 53R and the intermediate seal ring 61, oil is supplied thereto via an oil passage 57R, the second space 56 is defined by the seal ring 53T and the intermediate seal ring 61, and oil is supplied thereto via an oil passage 57T.

In accordance with this embodiment, by individually controlling the pressure and temperature of oil supplied to the first space 55 and the second space 56, the damping force in the radial direction due to the squeeze film of the first space 55 and the damping force in the axial direction due to the squeeze film of the second space 56 can be independently adjusted.

Embodiments of the present invention are explained above, but the present invention may be modified in a variety of ways as long as the modifications do not depart from the gist of the present invention.

For example, the subject to which the present invention is applied is not limited to the rear first bearing 14 of the gas turbine engine of the embodiments, and it may be applied to another bearing of a gas turbine engine, and it is also possible to apply it to a bearing of any application other than a gas turbine engine.

Furthermore, the rear first bearing 14 of the embodiments is a ball bearing, but it may be another type of bearing such as a roller bearing or a needle bearing.

What is claimed is:

1. A squeeze film damper bearing device comprising an inner race that is fitted around an outer periphery of a rotating shaft, an outer race that is supported on an inner periphery of a bearing retaining member and has an end face in an axial direction of the outer race that is adjacent to an end plate fixed to the bearing retaining member, a plurality of rolling bodies that are disposed between the inner race and the outer race, and an annular space that is defined by abutment with a pair of seal rings between the outer race and each of the bearing retaining member and the end plate, the annular space forming a squeeze film, wherein the annular space comprises a first space facing an outer peripheral face of the outer race and defined between the outer peripheral face of the outer race and the bearing retaining member and in which one of the pair of seal rings is disposed, and a second space facing the end face in the axial direction of the outer race and defined between the end face in the axial direction of the outer race and the end plate and in which a different one of the pair of seal rings is disposed, the second space being continuous with the first space and extending from the outer peripheral face of the outer race to an inner peripheral face of the outer race that faces the inner race.

2. The squeeze film damper bearing device according to claim 1, wherein a pair of the second space are defined so as to face opposite end faces in the axial direction of the outer race.

3. The squeeze film damper bearing device according to claim 1, further comprising an intermediate seal ring that provides a partition between the first space and the second space.

\* \* \* \* \*